United States Patent Office 2,887,903
Patented May 26, 1959

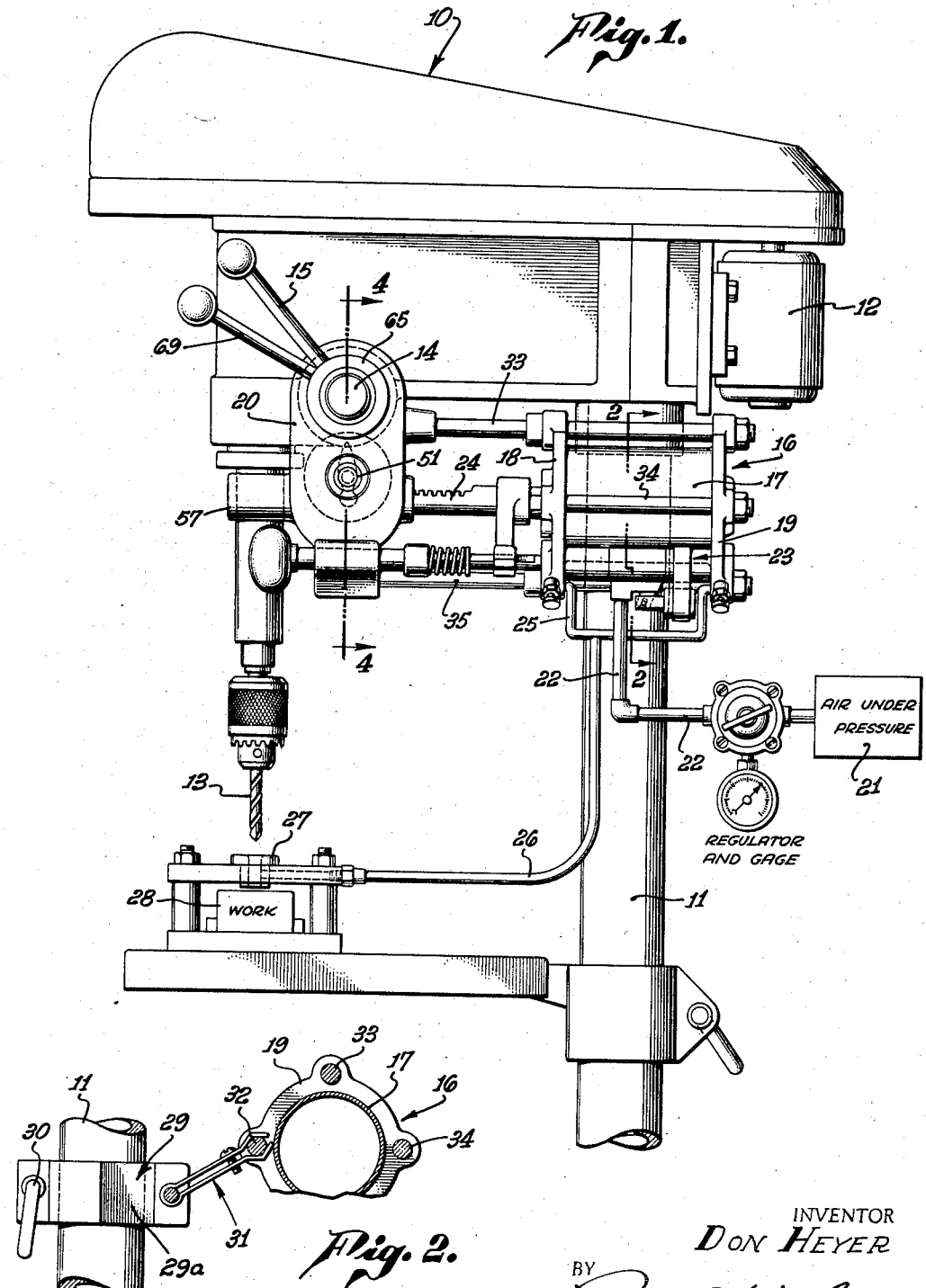

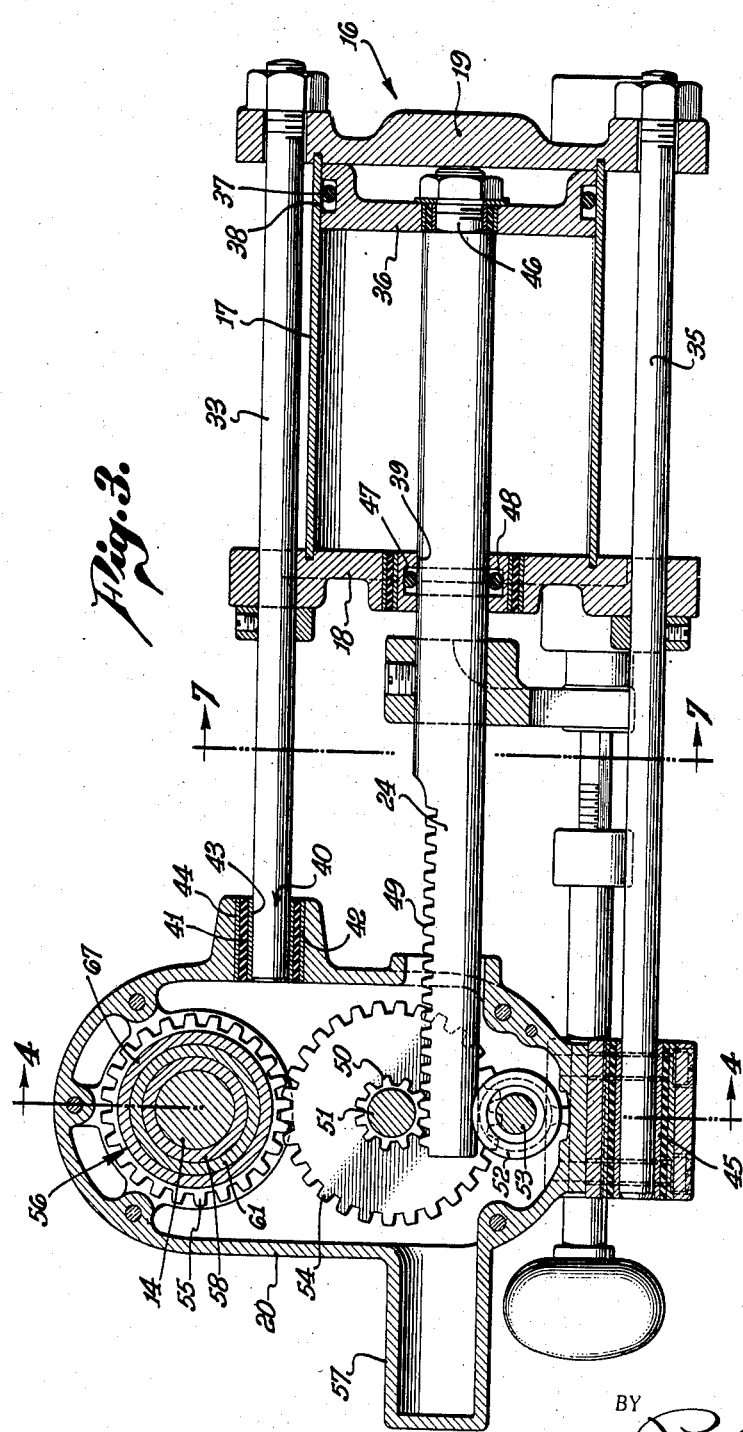

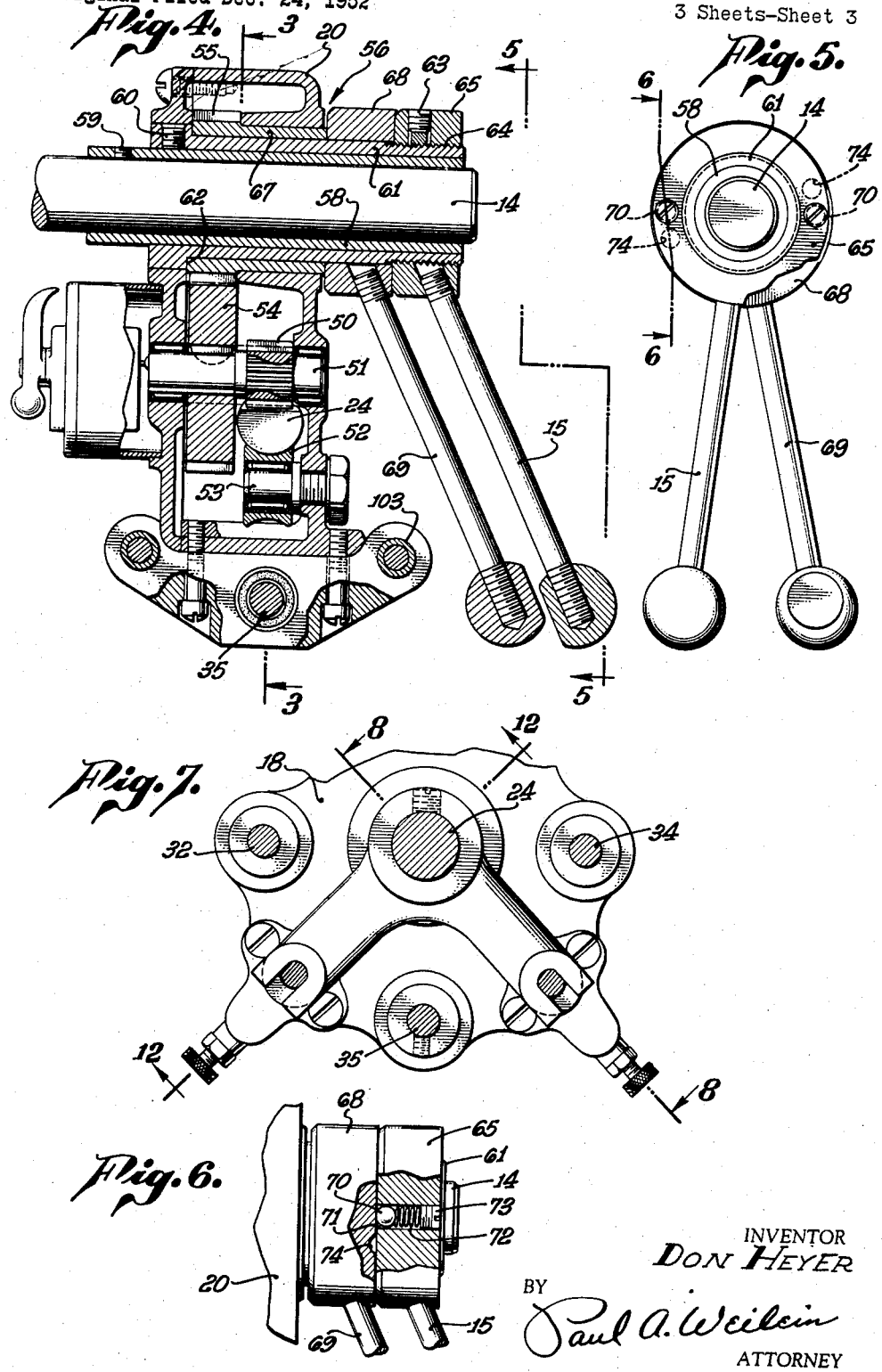

2,887,903

CLUTCH MEANS FOR POWER FEED MECHANISM

Don Heyer, El Monte, Calif.

Original application December 24, 1952, Serial No. 327,755. Divided and this application October 22, 1956, Serial No. 617,528

9 Claims. (Cl. 74—625)

This invention relates to apparatus for effecting relative advance and withdrawal between a tool and the work upon which the tool is to operate, as in a drill press or similar machine.

The present application is a division of my pending application, Serial Number 327,755, filed December 24, 1952, which is a division of application, Serial Number 687,401, now Patent Number 2,624,319, and relates to the clutch controlled drive means as embodied in the apparatus shown in said pending application for the purpose of effecting longitudinal movement of the spindle of a drill press or of a similar tool supporting member.

In order that the construction, operation and advantages of this clutch controlled drive means readily may be undersoood, the present application repeats herewith a description of the apparatus shown in the aforesaid pending application.

It is an object of the present invention to provide an improved clutch controlled drive means for effecting and controlling the longitudinal movement of the spindle of a drill press, or of a similar tool supporting element, to obtain the desired movement of the tool toward and away from the work.

It is another object of this invention to provide a clutch controlled drive means such as described, which is of a simple and compact construction, adapted for ready application to drill presses, or similar machines, to control the longitudinal movement of the spindle thereof either manually or by power actuated means at the will of the operator.

It is another object of this invention to provide a simple and novel clutch construction, whereby the drive means associated therewith may be quickly decoupled from the spindle control shaft in order that the longitudinal movement of the tool may be controlled manually without the use of the power actuating drive means.

It is another object of this invention to provide a drive means of the character described, which effects the desired longitudinal movement of the spindle responsive to a comparatively small movement of an actuating member, for example, a short stroke of a plunger or piston rod. This makes possible the provision of a compact drive-clutch unit subject to a convenient mounting on a drill or the like.

It is another object hereof to provide a clutch controlled drive unit such as described, which by reason of its simplicity, compactness, and small size readily lends itself to use in connection with any apparatus employed for effecting a power operation of the spindle of various types of drill presses and the like to move the tool into and out of contact with the work.

This invention possesses many other advantages and has other objects which may be made more easily apparent from a consideration of one embodiment of the invention. For this purpose there is shown in the drawings accompanying and forming part of the present specification, a form of this invention exemplified as applied to a drill press having a spindle which controls the longitudinal position of a drill bit with respect to the work into which the bit is designed to penetrate. This form will now be described in detail, illustrating the general principles of the invention. It is to be understood that, while exemplified in apparatus applied to a drill press, the teachings of this invention are similarly applicable to many types of machines and machine tools; therefore this detailed description is not to be taken in a limiting sense, since the scope of the invention is best defined by the appended claims.

Referring to the drawings:

Fig. 1 is a side elevation of a drill press with the powered driving apparatus of the present invention mounted thereon;

Fig. 2 is a sectional elevational view taken along line 2—2 of Fig. 1, showing a portion of the mounting means for securing the apparatus of this invention to a drill press;

Fig. 3 is a sectional view taken along line 3—3 of Fig. 4, showing the driving cylinder and piston, together with the rack and pinion connection to the clutch shown in Figs. 4, 5, and 6;

Fig. 4 is a sectional view taken on line 4—4 of Figs. 1 and 3, showing particularly the clutch arrangement and related gearing assembly through which motion of the driving means is transmitted to the conventional spindle control shaft of the drill press;

Fig. 5 is an elevational view taken along line 5—5 of Fig. 4, showing the clutch control handles positioned for powered operation of the drill, i.e., for clutch engagement;

Fig. 6 is an elevational partially sectioned, taken along line 6—6 in Fig. 5; and Fig. 7 is a section along line 7—7 of Fig. 3.

Referring now specifically to Fig. 1, there is shown a conventional form of drill press 10, having an upright standard 11, a drill rotating motor 12, and a drill bit 13. Bit 13 is raised and lowered in accordance with the angular position of rotatable spindle control shaft 14 controlled by handle 15, which latter may form a portion of the control apparatus of this invention.

Mounted on the conventional drill press thus far described is the air-powered driving means 16 of this invention, including a cylinder 17 having end plates 18 and 19, to which is secured a clutch housing 20, the latter being mounted over spindle control shaft 14. A suitable source 21 of air under pressure is connected through pipe 22 to a valve 23 preferably formed as a unitary structure with cylinder 17 and utilizing end plates 18 and 19.

Air from source 21, applied selectively through valve 23 to cylinder 17, serves to reciprocate a rack 24 coupled through gearing and clutch means in housing 20 to shaft 14, thereby raising and lowering drill bit 13. Air exhausted from cylinder 17 returns through valve 23 to outlet pipes 25 forming a common duct at 26 leading to a hole in bit guide 27 affixed above the work 28. In this manner, an intermittent flow of air is discharged against the rotating bit 13 during operation thereof.

The several portions of the assembly thus far described generally will now be fully described in detail.

The driving means 16 including cylinder 17 is mounted on the standard 11, as shown in Fig. 2. Clamping means 29, including a split ring 29a and a clamping bolt 30, serve to anchor adjustably on standard 11 a clamp 31, which in turn supports cylinder 17, by the engagement of clamp 31 with bolt 32, one of the bolts which serves to hold together end plates 18 and 19. Of the remaining three bolts 33, 34, and 35, bolts 33 and 35, situated respectively at the top and bottom of cylinder 17, continue forwardly of plate 18 and serve to strengthen the apparatus through connection with housing 20.

Referring particularly to Fig. 3 showing the driving means 16 and housing 20, it will be seen that the right hand end of rack 24 constitutes a piston rod to which is attached, within cylinder 17, a piston 36 having a piston ring 37 forming an air-tight, slidable seal between piston 36 and the inside wall of cylinder 17, and preferably in the form of a toroid of elastic material such as oil resistant synthetic rubber. As is known in the art, ring 37 is free to roll slightly in annular groove 38 in the edge of piston 36. In so doing it stretches, thereby forming a good air seal between piston 36 and the inside of the wall of cylinder 17.

Inasmuch as driving means 16 is mounted on one portion of drill press 10 and housing 20 is mounted on another portion thereof, it is desirable to provide that the mounting and other connections between driving means 16 and housing 20 shall be pliant within small limits. To this end the engagement of rack 24 with piston 36, and the port 39 through which rack 24 emerges from cylinder 17 include pliant mounting means. Such a mounting means is shown, for example, at end 40 of rod 33, in the form of a sleeve 41 of resilient material, such as oil resistant synthetic rubber interposed between end 40 and opening 42 in housing 20 in which end 40 is received. The pliant mounting means includes, in addition to resilient sleeve 41, inner and outer metal sleeves 43 and 44, respectively. Similar pliant mounting means are provided at 45 on extended bolt 35 and at 46 where rack 24 is attached to piston 36; also around port 39 where rack 24 emerges from cylinder 17 through end plate 18. It will be noted that end plate 18 at port 39 includes a groove 47 and elastic ring 48 functioning in the manner described for groove 38 and elastic ring 37 of piston 36.

Teeth 49 of rack 24 coact with pinion 50 mounted on shaft 51 journaled in housing 20, being held thereagainst by a saddle shaped roller 52 (Fig. 4) mounted on shaft 53 likewise journaled in housing 20.

To transmit reciprocation of the rack 24, impelled by air-powered driving means 16, to spindle control shaft 14, a gear 54 also mounted on shaft 51 meshes with a gear 55 journaled coaxially around shaft 14 and coupled thereto through a clutch 56 to be presently described in connection with Fig. 4. Extreme forward movement of piston 36 necessitates the inclusion of a hollow boss 57 on housing 20 for the reception of the end of rack 24.

Clutch 56 is shown in detail in Fig. 4, which also illustrates the manner in which housing 20 is mounted on shaft 14.

To accommodate the apparatus of this invention to spindle control shafts of various diameters, a bushing 58 is provided, which is secured to shaft 14 by means of set screw 59. Mounted on bushing 58 and secured thereto by a set screw 60, is a sleeve 61 having an annular shoulder 62 at one end thereof. On the other end of sleeve 61 from shoulder 62 is mounted, by means of set screw 63 and threads 64, a collar 65 from which extends a control handle 15. The outer surface of sleeve 61 constitutes a bearing surface on which is rotatably mounted a sleeve 67 preferably formed integral with gear 55. It will be noted that sleeve 67 extends axially a short distance beyond housing 20, where it contacts a collar 68 interposed between collar 65 and sleeve 67 and having also a handle 69 extending therefrom. Collar 68 is mounted on sleeve 61 so as to be axially and angularly slidable thereon.

Reviewing the assembly thus far described, it will be seen that sleeve 67, oscillating in accordance with reciprocation of rack 24 through the coaction of gears 50, 54, and 55, imparts this oscillation to shaft 14 through sleeve 61, and bushing 50, by selective coupling of sleeve 61 with sleeve 67. Such coupling is accomplished through collars 65 and 68 as will be explained in connection with Fig. 5.

Selective axial pressure between collars 65 and 68 is effected by the action of a ball 70 (Figs. 5 and 6) contained in an axial hole 71 in collar 65 and biased against the surface of collar 68 by a spring 72 held in position by an inset screw 73. To relieve pressure on ball 70 against collar 68, a hemispherical recess 74 is provided in which ball 70 may seat when a predetermined angular relation exists between collars 65 and 68.

When handles 15 and 69 are juxtaposed, ball 70 registers with recess 74 thereby relieving pressure between collars 65 and 68, and shaft 14 is free to turn relative to sleeve 67. Upon relative angular separation of handles 15 and 69, as shown in Fig. 6, ball 70 is moved from recess 74, whereupon the pressure of spring 72 against ball 70 and of ball 70 against collar 68 presses collar 68 against sleeve 67, and sleeve 67 against shoulder 62. The frictional engagement thus provided between shoulder 62 of sleeve 61 and sleeve 67, and between the end of sleeve 67 and collar 68 serves to clutch sleeve 61 to sleeve 67, whereby movement of rack 24 is imparted to shaft 14. If desired, a pair of pressure-producing means consisting of the assembly 70, 71, 72, 73 and 74 may be provided as shown in Fig. 5, diametrically disposed in collar 65.

Handles 15 and 69, when together, signify "manual" operating position, in which driving means 16 is completely de-coupled from the drill press. Handles 15 and 69, when separated, as shown in Figs. 5 and 6, signify the "powered" operating position, in which longitudinal movement of drill bit 13 is controlled by driving means 16.

The apparatus is applied to drill press 10 with driving means 16 (Fig. 1) anchored to standard 11 by cooperative clamp members 29 and 31 (Fig. 2). A bushing 58 (Figs. 3 and 4) of proper internal diameter to fit snugly on shaft 14 of drill press 10 is selected and anchored to shaft 14 by set screw 29. Sleeve 61 is slipped over bushing 58 and anchored thereto by set screw 60, thereby providing support for housing 20 of the apparatus. In this manner each end of the apparatus, 16 and 20, is supported on drill press 10. Any slight discrepancy in the mounting is absorbed in the pliant mounting means at ends 40 and 45 of rods 33 and 35, respectively.

For manual operation, it is necessary only to juxtapose handles 15 and 69 from their positions shown in Figs. 4, 5 and 6, thus causing balls 70 to seat in recesses 74. This relieves pressure on sleeve 67 and allows shaft 14 to be manually turned by juxtaposed actuation of handles 15 and 69. Sleeve 67 and the remainder of the power driven assembly are effectually de-coupled from shaft 14 during this operation, and the operator controls press 10 as though the apparatus of this invention were not present.

I claim:

1. Power feed apparatus for a machine having a rotatable shaft the angular position of which determines the longitudinal position of a tool with respect to work, comprising: a first sleeve adapted to be mounted on said shaft, a shoulder on said first sleeve, a collar on said first sleeve movable axially thereon, a second sleeve rotatably mounted on said first sleeve intermediate said shoulder and said collar, selectively operable means effective to axially press said collar against said second sleeve and said second sleeve against said shoulder thereby frictionally engaging said second sleeve with said first sleeve, and driving means effective to rotate said second sleeve, thereby imparting relative motion between said tool and the work.

2. Apparatus for driving a rotatable shaft comprising: a sleeve adapted to be fixed to said shaft; means on said sleeve providing a surface adapted to be engaged for driving said sleeve and said shaft; a sleeve rotatable on said first mentioned sleeve; said rotary sleeve having a driving portion adapted to engage said surface to drive said first mentioned sleeve and said shaft; a collar freely rotatable and axially movable on said first mentioned sleeve for urging said driving portion into driving engagement with said surface; means for rotating said rotary sleeve; and means operatively connected with said collar selectively operable for manually turning said first mentioned sleeve and moving said collars axially to urge said driving portion into driving contact with said surface.

3. Apparatus for driving a rotatable shaft comprising: a sleeve adapted to be fixed to said shaft; means on said sleeve providing a surface adapted to be engaged for driving said sleeve and said shaft; a sleeve axially movable and freely rotatable on said first mentioned sleeve; said rotary sleeve having a driving portion adapted to engage said surface to drive said first mentioned sleeve and said shaft; a collar rotatable and axially movable on said first mentioned sleeve; means on said rotary sleeve engageable with means for driving said rotary sleeve; a second collar fixed to said first mentioned sleeve; handles extending from said collars operable to selectively turn said collars about the axis of said shaft; and means between said collars operable to move said first mentioned collar axially to urge said driving portion into driving contact with said surface responsive to relative turning movement of said collars; said last named means causing said first mentioned collar to turn freely relative to said rotary sleeve when the handles are simultaneously correspondingly moved to rotate said fixed collar and shaft independent of said driving means.

4. Apparatus for driving a rotatable shaft comprising: a sleeve adapted to be fixed to said shaft; means on said sleeve providing a surface adapted to be engaged for driving said sleeve and said shaft; a sleeve axially movable and freely rotatable on said first mentioned sleeve; said rotary sleeve having a driving portion adapted to engage said surface to drive said first mentioned sleeve and said shaft; a collar rotatable and axially movable on said first mentioned sleeve for urging said rotary sleeve to a position in which said driving portion drivingly engages said surface; means for driving said rotary sleeve; a second collar fixed to said first mentioned sleeve in opposed relation to the first mentioned collar; one of said collars having a depression therein; a spring loaded detent on the other collar engageable in said depression; relative turning movement of said collars causing said detent to move out of said depression and urge said first mentioned collar axially for moving said rotary sleeve to drivingly engage said driving portion with said surface; corresponding turning of said collars when said detent is engaged in said recess causing said first mentioned sleeve and said shaft to be turned independently of said driving means; and handles extending from said collars selectively operable for joint and relative turning of said collars.

5. Apparatus for driving a rotatable shaft comprising: a sleeve adapted to be fixed to said shaft; means adjacent one end of said sleeve providing a surface adapted to be engaged for driving said sleeve and shaft; a sleeve axially movable and freely rotatable on said first mentioned sleeve having one end adapted to be drivingly engaged with said surface; said first mentioned sleeve extending outwardly from the other end of said axially movable sleeve; a collar freely rotatable and axially movable on said extended portion of said first mentioned sleeve adapted to abut said other end of said axially movable sleeve; a handle for turning said collar relative to said first mentioned sleeve; a second collar fixed on said extended portion of said first mentioned sleeve adapted to abut said first mentioned collar; a handle for turning said second collar to likewise turn said first mentioned sleeve and said shaft; and means interposed between said collars operable to cause both collars to turn when both handles are moved correspondingly; said last named means causing said axially movable collar and said axially movable sleeve to be moved to drivingly engage said one end of said axially movable sleeve with said surface responsive to relative movement of said handles and consequent relative turning movement of said collars.

6. Apparatus for driving a rotatable shaft comprising: a sleeve adapted to be fixed to said shaft; means adjacent one end of said sleeve providing a surface adapted to be engaged for driving said sleeve and shaft; a sleeve axially movable and freely rotatable on said first mentioned sleeve having one end adapted to be drivingly engaged with said surface; said first mentioned sleeve extending outwardly from the other end of said axially movable sleeve; a collar freely rotatable and axially movable on said extended portion of said first mentioned sleeve adapted to abut said other end of said rotary sleeve; a handle for turning said collar relative to said first mentioned sleeve; a second collar fixed on said extended portion of said first mentioned sleeve adapted to abut said first mentioned collar; a handle for turning said second collar to likewise turn said first mentioned sleeve and said shaft; one of said collars having a depression therein; and a spring-loaded detent on one of said collars adapted to be moved into and out of said depression.

7. A driving unit for application to a rotatable shaft comprising: a housing having a portion adapted to be mounted on a portion of said shaft; said housing having another portion adapted to support means for driving said shaft; a gear in said first named portion of said housing adapted to be mounted on said shaft for rotation relative thereto in driving engagement with said driving means; said first named portion of said housing having opposed portions interiorly thereof engaging said gear to restrain axial movement of said gear; a member in said first named portion of said housing adapted to be fixed to said shaft; said member being engageable with said gear to drive said shaft; and means adapted to be mounted on said shaft operable for applying a force to urge said gear into driving engagement with said member.

8. A driving unit for application to a rotatable shaft comprising: a housing having a portion adapted to be mounted on a portion of said shaft; said housing having another portion adapted to support means for driving said shaft; gear means in said housing adapted to be mounted on said shaft for rotation relative thereto; said first named portion of said housing providing a tubular bearing portion for a part of said gear means; said gear having another part engaged with a wall of said housing and an end of said tubular bearing portion respectively, to restrain axial movement of said gear means; said gear means being adapted for driving engagement with said driving means; a member supported in said housing adapted to be fixed to said shaft engageable with said gear means for driving said shaft; and means adapted to be supported on said shaft operable to apply a force to said gear means to urge said gear means into driving engagement with said member.

9. A driving unit for application to a rotatable shaft comprising: a housing adapted to be supported on said shaft; drive means in said housing for rotating said shaft; said drive means including a gear adapted to surround said shaft for free rotation thereon; said gear including an axial extension bearing means for said axial extension in said housing; said gear having surfaces engaging a wall of said housing and said bearing means respectively, to restrain axial movement of said gear; said gear being drivingly engaged with said driving means; a member within said housing adapted to be fixed to said shaft and having a surface engageable by said gear for driving said member and said shaft; and means adapted to be mounted on said shaft optionally operable for manually turning said shaft or applying a force to urge said gear into driving engagement with said surface to drive the shaft through said gear.

References Cited in the file of this patent
UNITED STATES PATENTS

| | | |
|---|---|---|
| 884,529 | Seib et al. | April 14, 1908 |
| 1,683,715 | Erban | Sept. 11, 1928 |